United States Patent
Kim et al.

(10) Patent No.: US 12,189,167 B2
(45) Date of Patent: Jan. 7, 2025

(54) LIGHT GUIDE PANEL AND LIGHTING DEVICE INCLUDING SAME

(71) Applicant: Corning Incorporated, Corning, NY (US)

(72) Inventors: Donghyun Kim, A-San (KR); Gun-sang Yoon, Hwaseong-si (KR)

(73) Assignee: CORNING INCORPORATED, Corning, NY (US)

(*) Notice: Subject to any disclaimer, the term of this patent is extended or adjusted under 35 U.S.C. 154(b) by 0 days.

(21) Appl. No.: 17/915,869

(22) PCT Filed: Mar. 30, 2021

(86) PCT No.: PCT/US2021/024791
§ 371 (c)(1),
(2) Date: Sep. 29, 2022

(87) PCT Pub. No.: WO2021/202461
PCT Pub. Date: Oct. 7, 2021

(65) Prior Publication Data
US 2023/0127424 A1 Apr. 27, 2023

(30) Foreign Application Priority Data
Mar. 31, 2020 (KR) .......... 10-2020-0039499

(51) Int. Cl.
*F21V 8/00* (2006.01)
(52) U.S. Cl.
CPC .......... *G02B 6/0041* (2013.01); *G02B 6/0061* (2013.01); *G02B 6/0065* (2013.01)

(58) Field of Classification Search
CPC .. G02B 6/0041; G02B 6/0061; G02B 6/0065; G02B 6/0063; G02B 6/004
See application file for complete search history.

(56) References Cited

U.S. PATENT DOCUMENTS

| | | | | |
|---|---|---|---|---|
| 5,751,386 A | * | 5/1998 | Kanda .................. | G02B 6/0043 362/23.15 |
| 6,290,364 B1 | | 9/2001 | Koike et al. | |

(Continued)

FOREIGN PATENT DOCUMENTS

| | | | | |
|---|---|---|---|---|
| CN | 110119003 A | | 8/2019 | |
| EP | 0717235 A2 | * | 6/1996 | ............... F21V 8/00 |

(Continued)

OTHER PUBLICATIONS

International Search Report and Written Opinion of the International Searching Authority; PCT/US2021/024791 Mailed on Jul. 19, 2021, 12 pages; Korean Patent Office.

(Continued)

*Primary Examiner* — Donald L Raleigh
(74) *Attorney, Agent, or Firm* — Svetlana Z. Short; Irene L Brookins

(57) ABSTRACT

Provided are a light guide panel and a lighting device including the same. The light guide panel includes a base substrate and a light-scattering layer provided on at least one of top and bottom surfaces of the base substrate with a matrix forming a layer on the base substrate and light-scattering particles dispersed in the matrix. A first portion of the light-scattering layer is distant from a light incident surface of the base substrate. A second portion of the light-scattering layer is located closer to the light incident surface than the first portion.

11 Claims, 4 Drawing Sheets

(56) References Cited

U.S. PATENT DOCUMENTS

| | | | |
|---|---|---|---|
| 6,612,710 B2 * | 9/2003 | Suzuki | G02B 6/0058 |
| | | | 362/333 |
| 2004/0160673 A1 * | 8/2004 | Se | G02B 5/0221 |
| | | | 359/615 |
| 2006/0187377 A1 | 8/2006 | You et al. | |
| 2007/0081780 A1 | 4/2007 | Scholl | |
| 2011/0273907 A1 * | 11/2011 | Iwasaki | G02B 6/0068 |
| | | | 362/607 |
| 2013/0033754 A1 | 2/2013 | Lin et al. | |
| 2013/0235614 A1 * | 9/2013 | Wolk | G02B 6/0066 |
| | | | 362/606 |
| 2015/0097166 A1 | 4/2015 | Setz et al. | |
| 2016/0011343 A1 * | 1/2016 | Lin | B29C 70/78 |
| | | | 264/1.24 |
| 2018/0188442 A1 * | 7/2018 | Wang | G02B 6/0065 |
| 2018/0372628 A1 * | 12/2018 | Craig | G02B 6/0063 |

FOREIGN PATENT DOCUMENTS

| | | |
|---|---|---|
| JP | 03-006525 A | 1/1991 |
| JP | 4467840 B2 | 5/2010 |
| KR | 10-0669060 B1 | 1/2007 |
| KR | 10-2011-0032476 A | 3/2011 |
| KR | 10-1090495 B1 | 12/2011 |
| KR | 10-2018-0039231 A | 4/2018 |

OTHER PUBLICATIONS

Extended European Search Report; 21780396.4; dated Mar. 7, 2024; 7 pages; European Patent Office.

\* cited by examiner

[FIG. 1]
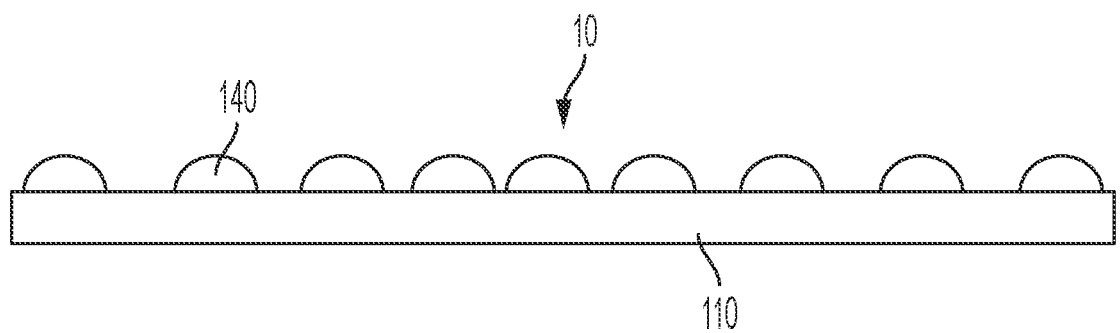
[FIG. 2]
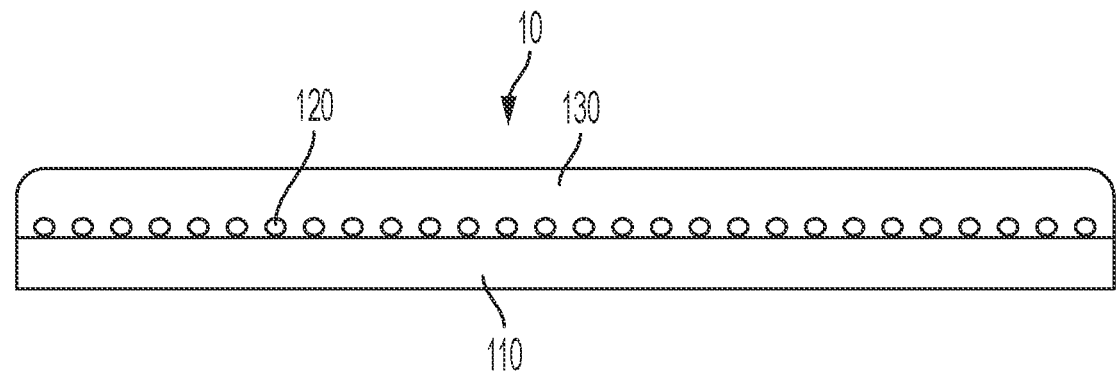
[FIG. 3]
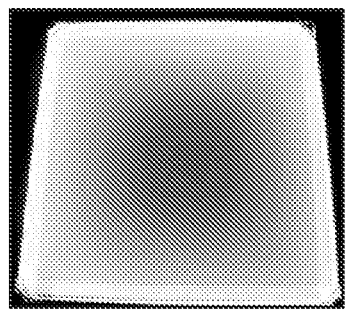

[FIG. 4]
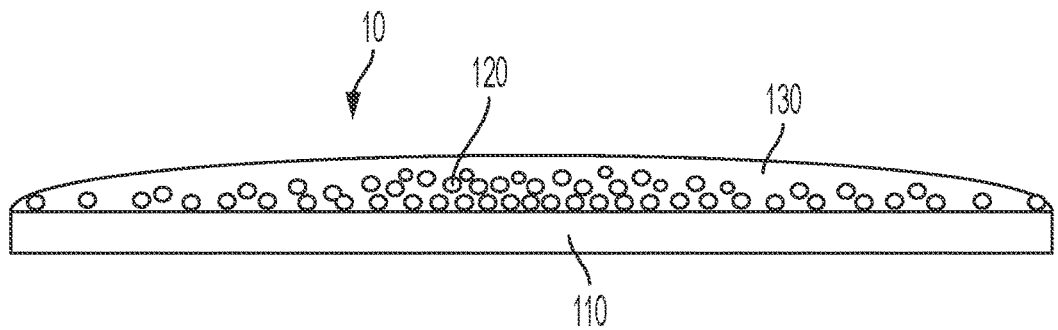
[FIG. 5]
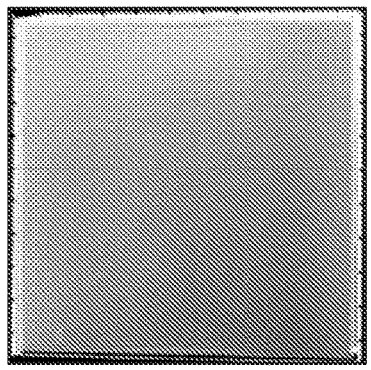
[FIG. 6]
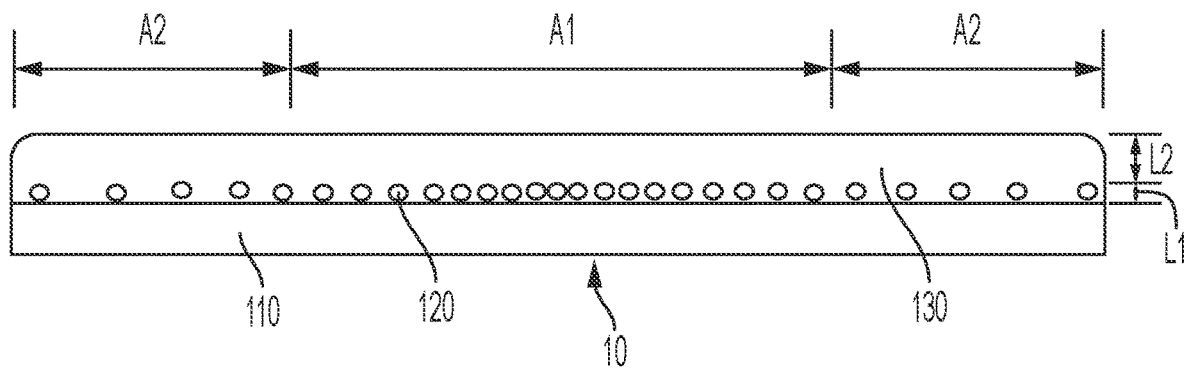

[FIG. 7]
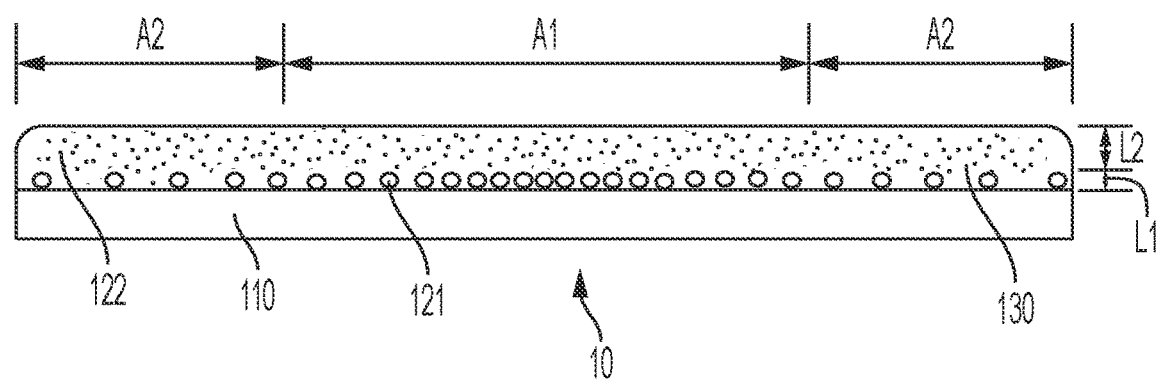
[FIG. 8]
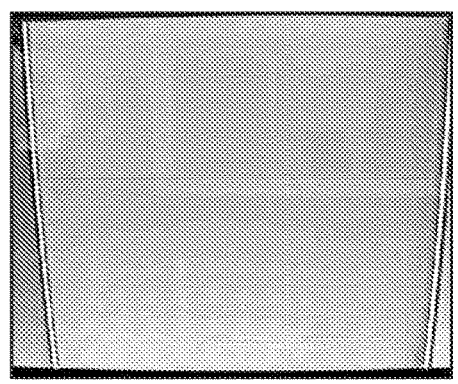

[FIG. 9]
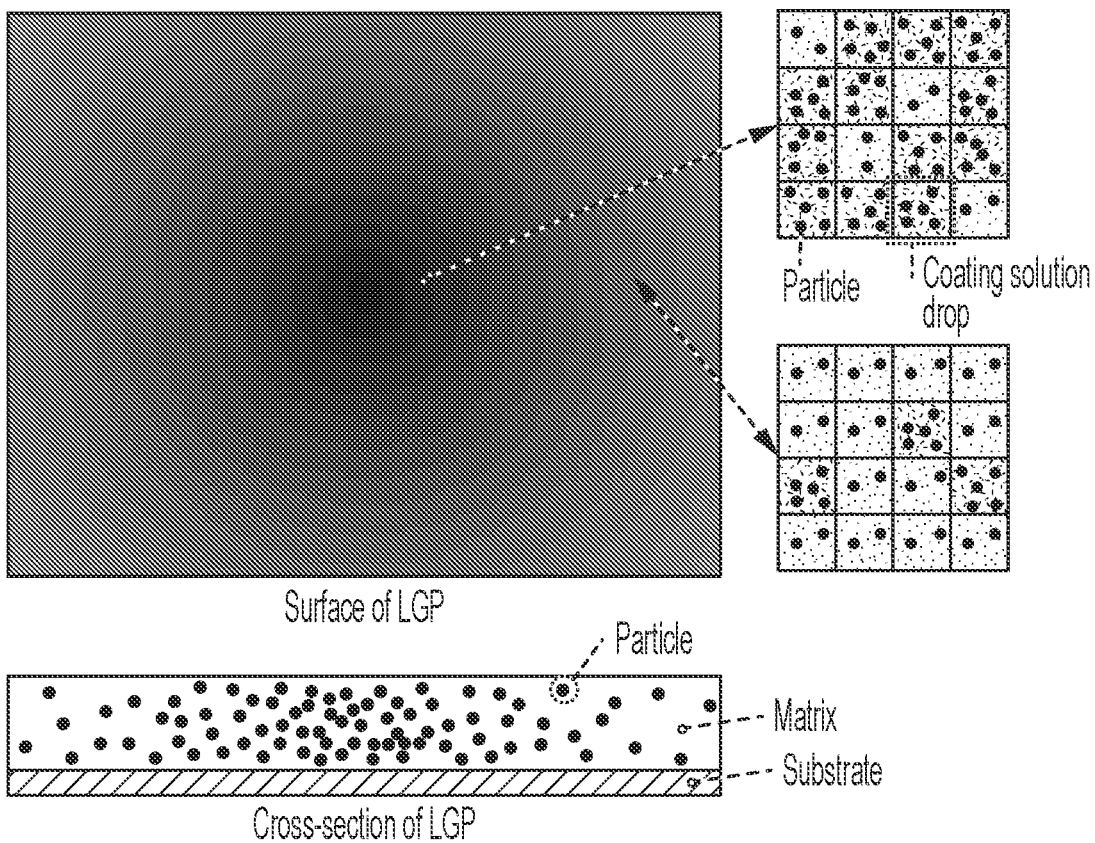
[FIG. 10]
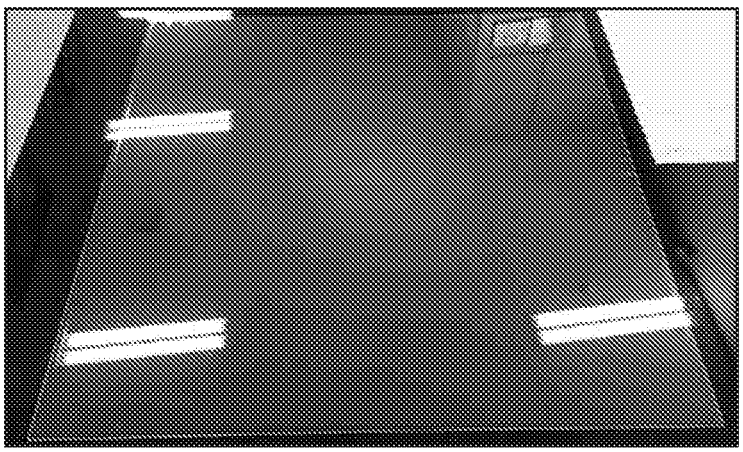

LIGHT GUIDE PANEL AND LIGHTING DEVICE INCLUDING SAME

CROSS REFERENCE TO RELATED APPLICATIONS

This application claims the benefit of priority under 35 U.S.C. § 371 of International Application No. PCT/US2021/024791, filed on Mar. 30, 2021, which claims the benefit of priority under 35 U.S.C. § 119 of Korean Patent Application Serial No. 10-2020-0039499 filed on Mar. 31, 2020, the content of each of which is relied upon and incorporated herein by reference in its entirety.

BACKGROUND

Field

The present disclosure relates to a light guide panel and a lighting device including the same, and more particularly, to a light guide panel having excellent luminance uniformity while able to minimize color shift, and a lighting device including the same.

Description of Related Art

Lighting devices of the related art are configured to provide unidirectional light emissions using point light sources of light-emitting diodes (LEDs) disposed in a specific location, a diffuser, a reflector, and the like. In contrast, a recently developed lighting device uses a light guide panel (LGP) in which light may enter a base substrate of the LGP through a side surface of the base substrate and may travel within the base substrate while undergoing total reflection and may exit the base substrate after encountering a roughness on a surface or a matter with a refractive index difference. This recent lighting device also uses a diffuser, a reflector, and the like to improve efficiency.

SUMMARY

Various aspects of the present disclosure provide a light guide panel having excellent luminance uniformity while able to minimize color shift, and a lighting device including the same.

According to an aspect, provided is a light guide panel including: a base substrate including a top surface, a bottom surface opposing the top surface, and side surfaces connecting the top and bottom surfaces, at least one side surface among the side surfaces defining a light incident surface; and a light-scattering layer provided on at least one of the top and bottom surfaces of the base substrate.

The light-scattering layer may include a matrix forming a layer on the base substrate and light-scattering particles dispersed in the matrix. A first portion of the light-scattering layer may be distant from the light incident surface, and a second portion of the light-scattering layer may be located closer to the light incident surface than the first portion. The thickness of the first portion of the light-scattering layer may be substantially equal to the thickness of the second portion of the light-scattering layer, and the density of the light-scattering particles in the first portion may be higher than the density of the light-scattering particles in the second portion.

In an embodiment in which a light source faces a pair of side surfaces (or four side surfaces) of the base substrate, the first portion may be a central portion, and the second portion may be a peripheral portion.

In some embodiments, the light-scattering layer may have a uniform thickness across the entire area of the light-scattering layer.

In some embodiments, the density of the light-scattering particles may continuously or gradually increase with an increase in a distance from the light incident surface.

In some embodiments, the light-scattering layer may include at least a first layer provided on the base substrate and a second layer provided on the first layer. The light-scattering particles may include first light-scattering particles dispersed in the first layer.

In some embodiments, the density of the first light-scattering particles in the first portion may be higher than the density of the first light-scattering particles in the second portion.

In some embodiments, the light-scattering particles may further include second light-scattering particles dispersed in the first layer and the second layer. The density of the second light-scattering particles in the first portion may be substantially equal to the density of the second light-scattering particles in the second portion.

In some embodiments, the light-scattering layer may include first local portions, in which the light-scattering particles have higher density, and second local portions, in which the light-scattering particles have lower density. The first portion may include a greater number of the first local portions and a smaller number of the second local portions than the second portion.

According to an aspect, provided is a method of fabricating a light guide panel including a base substrate and a light-scattering layer.

The method may include forming the light-scattering layer on at least one surface of the top and bottom surfaces of the base substrate, the light-scattering layer including a matrix forming a layer on the base substrate and light-scattering particles dispersed in the matrix and having a first portion distant from the light incident surface and a second portion located closer to the light incident surface than the first portion, such that the thickness of the first portion of the light-scattering layer is substantially equal to the thickness of the second portion of the light-scattering layer, and the density of the light-scattering particles in the first portion is higher than the density of the light-scattering particles in the second portion.

In some embodiments, the light-scattering particles may include first light-scattering particles. In addition, forming the light-scattering layer may include: dispersing the first light-scattering particles on the base substrate such that the density of the first light-scattering particles in the first portion is higher than the density of the first light-scattering particles in the second portion; and forming the layer of the matrix on the base substrate to cover the first light-scattering particles, such that the thickness of the light-scattering layer in the first portion is substantially equal to the thickness of the light-scattering layer in the second portion.

In some embodiments, the light-scattering particles may include second light-scattering particles. In addition, forming the layer of the matrix may include providing the matrix containing the second light-scattering particles therein on the base substrate.

In some embodiments, the at least one surface of the base substrate may include local areas. In addition, forming the light-scattering layer may include: preparing a first mixture and a second mixture each including the matrix and the light-scattering particles, wherein the density of the light-scattering particles in the first mixture is higher than the density of the light-scattering particles in the second mixture; and applying one mixture selected from the first mixture and the second mixture on each of the local areas of the base substrate, such that the first mixture is applied to a greater number of the local areas in the first portion than in the second portion and the second mixture is applied to a smaller number of the local areas in the first portion than in the second portion.

In some embodiments, the at least one surface of the base substrate may include local areas. In addition, forming the light-scattering layer may include: preparing a first mixture and a second mixture each including the matrix and the light-scattering particles, wherein the density of the light-scattering particles in the first mixture is higher than the density of the light-scattering particles in the second mixture; and applying both the first mixture and the second mixture to each of the local areas of the base substrate, such that a greater amount of the first mixture and a smaller amount of the second mixture are applied to the local areas in the first portion than in the second portion.

As set forth above, the present disclosure may provide a light guide panel having excellent luminance uniformity while able to minimize color shift, and a lighting device including the same.

The methods and apparatuses of the present disclosure have other features and advantages that will be apparent from or that are set forth in greater detail in the accompanying drawings, the disclosures of which are incorporated herein, and in the following Detailed Description, which together serve to explain certain principles of the present disclosure.

DESCRIPTION OF THE DRAWINGS

FIG. 1 is a schematic view illustrating the structure of a light guide panel according to a comparative embodiment;

FIG. 2 is a schematic view illustrating the structure of a light guide panel according to another comparative embodiment;

FIG. 3 is a view illustrating a light emission state of a lighting device including the light guide panel illustrated in FIG. 2;

FIG. 4 is a schematic view illustrating the structure of a light guide panel according to another comparative embodiment;

FIG. 5 is a view illustrating a light emission state of a lighting device including the light guide panel illustrated in FIG. 4;

FIG. 6 is a schematic view illustrating the structure of a light guide panel according to an embodiment of the present disclosure;

FIG. 7 is a schematic view illustrating the structure of a light guide panel according to another embodiment of the present disclosure;

FIG. 8 is a view illustrating a light emission state of a lighting device including the light guide panel illustrated in FIG. 7;

FIG. 9 is a schematic view illustrating the structure of a light guide panel according to another embodiment of the present disclosure; and FIG. 10 is a picture illustrating an external appearance of the light guide panel, illustrated in FIG. 9, using a glass substrate as a base substrate.

DETAILED DESCRIPTION

Hereinafter, embodiments of the present disclosure will be described in detail with reference to the accompanying drawings.

In an embodiment, a lighting device of the present disclosure may be a transparent lighting device that is transparent when power is turned off. In the present disclosure, light-scattering particles may be dispersed on a base substrate with different densities depending on the position thereof. In addition, the light-scattering particles and a matrix layer (e.g. a binder) fixing the light-scattering particles may have substantially the same height in order to avoid interference color issues. The lighting device of the present disclosure may be used for interior lighting, and thus, a light-scattering layer may have a predetermined higher level of hardness (e g higher than 3H) so as not to be damaged by scratches. In addition, the surface of the light-scattering layer may be flat in order to impart glossy characteristics as an aesthetic element.

A transparent base substrate (e.g. a glass base substrate) may be coated with a light-scattering layer, and a resultant light guide panel may be hazy due to the fine light-scattering particles. However, the resultant light guide panel may remain transparent, since the light-scattering particles are invisible to the eye. When the resultant light guide panel is turned on and guides light, it has uniform luminance over the entire area thereof, regardless of the distance from a light source. In this manner, a transparent lighting device including the light guide panel may be provided.

The transparent lighting device may be used for interior lighting, may remain transparent without restricting visibility when not emitting light so that a space in which the lighting device is disposed may be recognized to be relatively wide, and may be turned on to emit uniform light when lighting is necessary.

In the present disclosure, the more a specific portion of the light-scattering layer is distant from the light source (or a side surface of the base substrate in an embodiment in which the side surface of the base substrate faces the light source), the higher the density of the light-scattering particles in the specific portion is. In an embodiment to be described hereinafter, the light sources are taken as being located on or adjacent to opposing side surfaces (or four side surfaces) of the base substrate, and the density of the light-scattering particles in the central portion of the light scattering layer distant from the side surfaces is higher than the density of the light-scattering particles in the peripheral portion closer to the side surfaces. However, in an embodiment in which the light source is located on or adjacent to only one side surface of the base substrate, the "central portion" to be described later should be substituted with a "portion distant from the light source" and the "peripheral portion" to be described later should be substituted with a "portion closer to the light source."

FIG. 1 is a schematic view illustrating the structure of a light guide panel 10 according to a comparative embodiment.

The light guide panel 10 enabling dual-surface lighting, as illustrated in FIG. 1, may be devised for interior design. The light guide panel 10 may use a polymethyl methacrylate (PMMA) substrate as a base substrate 110. This is because color may not occur in the light guide panel 10 and because a shape (or pattern) for redirecting light that has been totally internally reflected to exit the light guide panel 10 may be easily machined using a laser, when the light guide panel 10 uses such a polymethyl methacrylate (PMMA) substrate 110.

However, in the light guide panel 10 unable to use either a diffuser or a reflector, structures 140 in the shape of lenses or pyramids are used to redirect light. Such structures 140 may provide a light emission profile in the shape of points, which is immediately noticeable, leading to viewer eye fatigue and providing a product having a series of light emission points, rather than the uniform surface emission of light, thereby degrading the aesthetic appeal of a finished product. In addition, the surface may be physically rough due to the structures 140, and the glossy characteristic, i.e. a major aesthetic element, of the lighting device, may not be provided. Furthermore, light deflection may occur, foreign objects may easily stick to the surface, and it may be difficult to wipe off the foreign objects.

FIG. 2 is a schematic view illustrating the structure of a light guide panel 10 according to another comparative embodiment. The light guide panel 10 includes a base substrate 110 and a matrix 130 comprising light-scattering particles 120, wherein the light-scattering particles 120 are evenly distributed. FIG. 3 is a view illustrating a light emission state of a lighting device including the light guide panel 10 illustrated in FIG. 2.

A method of coating a base substrate 110 with a solution containing light-scattering particles 120 (i.e. light-scattering particles having sub-micron sizes) having a different refractive index may be devised to provide a light guide panel 10 10. The deflection of light disappears, and the light-scattering particles 120 are not visually recognizable, due to minute sizes, a low density, and the like. Thus, the problems as described above with reference to FIG. 1 may be removed or reduced. However, in this method of applying a solution including light-scattering particles, luminance uniformity may not be secured, which may be problematic. For example, in a case in which the coating is provided on the entire area of one surface of the base substrate 110, luminance may decrease with increases in the distance from the light source.

FIG. 4 is a schematic view illustrating the structure of a light guide panel 10 according to another comparative embodiment. The light guide panel 10 includes a base substrate 110 and a matrix 130 comprising light-scattering particles 120, wherein the light-scattering particles 120 are unevenly distributed. FIG. 5 is a view illustrating an emission state of a lighting device including the light guide panel 10 illustrated in FIG. 4.

In a case in which the base substrate 110 of the light guide panel 10 is coated with different amounts of solution to vary the amount of light-scattering particles 120 according to the position of the light guide panel 10, the thickness of the coating layer may vary depending on the position. Although luminance is uniform, differences in refractive indices may be caused, thereby causing color shift of light. That is, light emitted from the light guide panel 10 may have different colors according to the position thereof, which is problematic.

The present disclosure has been made in order to overcome the above-described overall problems of the transparent light guide panel.

FIG. 6 is a schematic view illustrating the structure of a light guide panel according to an embodiment of the present disclosure.

A light guide panel 10 is depicted in FIG. 6, where a base substrate 110 with a first portion A1 and a second portion A2 is coated with light-scattering particles 120 (e.g., light-scattering particles 120 having an average particle size of 10 μm or less) that may be dispersed within a first layer L1 such that the density thereof increases with increases in the distance from a light source in order to provide uniform luminance. In addition, the thickness of a light-scattering layer may be set to be uniform, thereby solving the problem of interference color. The light guide panel 10 may also comprise a matrix 130 containing a second layer L2.

In some embodiments, the density (i.e. volume ratio) of the light-scattering particles with respect to the matrix 130 may be lower than 0.4%.

FIG. 7 is a schematic view illustrating the structure of a light guide panel 10 according to another embodiment of the present disclosure. The light guide panel 10 includes a base substrate 110 and a matrix 130 comprising light-scattering particles 121 in a first layer L1 and light-scattering particles 122 in the second layer L2, wherein the light-scattering particles 121 are unevenly distributed and the light-scattering particles 122 are evenly distributed. In some embodiments, the light-scattering particles further comprise second light-scattering particles dispersed in the first layer and the second layer, and the density of the second light-scattering particles in the first portion being substantially equal to the density of the second light-scattering particles in the second portion. FIG. 8 is a view illustrating an emission state of a lighting device including the light guide panel illustrated in FIG. 7.

As illustrated in FIG. 7, after a base substrate 110 is coated with light-scattering particles 121 having, for example, an average particle size of 10 μm or less, a matrix material 130 containing smaller light-scattering particles 122 (e.g. light-scattering particles having an average particle size of 1 μm or less) may be applied at a uniform thickness, thereby removing visible density differences in the light-scattering particles that would otherwise happen.

Accordingly, as illustrated in FIG. 8, the light guide panel having high luminance uniformity may be produced, and different densities of the light-scattering particles are invisible to the eye.

FIG. 9 is a schematic view illustrating the structure of a light guide panel according to another embodiment of the present disclosure, and FIG. 10 illustrates an external appearance of the light guide panel, illustrated in FIG. 9, using a glass substrate as a base substrate.

As illustrated in FIGS. 9 and 10, the light guide panel including light-scattering particles, densities of which vary according to the distance from a light source, may be fabricated by coating a base substrate with two different-density solutions in the form of an inverted map.

A light-scattering layer may be fabricated by coating (inkjet printing). The base substrate may be a transparent substrate, such as a glass substrate or a polymethyl methacrylate (PMMA) substrate. The light-scattering layer may contain light-scattering particles serving as media refracting light, with a refractive index of 1.5 or more and a size of 10 μm, and a transparent matrix material having a refractive index lower than the refractive index of the light-scattering particles.

The light-scattering particles are positioned such that the density thereof increases with increases in the distance from the light source, and the overall thickness of the light-scattering layer is the same.

The lighting device according to the present disclosure may be used as a transparent light device which remains transparent when power is turned off and serves as a lighting device when power is turned on.

The light-scattering particles may be particles of $TiO_2$, $ZrO_2$, $BaTiO_3$, $SnO_2$, or the like.

The thickness uniformity of the light-scattering layer may be higher than 95%. The thickness of the light-scattering layer may range from 1 μm to 10 μm. A dried thickness of the light-scattering layer lower than 1 μm may not be preferable, since it cannot achieve Lambertian light distribution.

A coating method may be inkjet printing, spray coating, or the like. Gravure printing may also be used; but a cost increase may result.

In some embodiments, in a solution including the light-scattering particles, the matrix, and a solvent, the density of the light-scattering particles may be lower than 5 wt %, the transmissivity of the light guide panel may be higher than 80%, and the haze of the light guide panel may be smaller than 10%. In addition, the density of the light-scattering particles with respect to the matrix may be lower than 1%. The surface roughness of the light-scattering layer may be equal to or less than 1 μm.

Available examples of the coating method for the light-scattering layer may include three methods as follows.

1. A solution containing light-scattering particles, the solution prepared by dispersing $BaTiO_3$ (BTO) light-scattering particles (e.g. light-scattering particles having an average particle size of 500 μm) in a solvent to be vaporized during high-temperature heating, is applied to a base substrate by inkjet printing. In the coating, different amounts of drops are applied to peripheral areas and the central area of the base substrate, such that the light-scattering particles serving to extract light have higher density with increases in the distance from the light source. Here, the coating is performed in such a manner that the dropped light-scattering particles are not clustered into a pattern. Afterwards, the solvent is entirely vaporized. When only the light-scattering particles remain on the base substrate, a solution including a matrix and a solvent may be applied to form a transparent binder layer (i.e. a matrix layer) with a thickness (e.g. 3 μm) on the entire area of the base substrate so as to sufficiently cover the light-scattering particles. Consequently, the light guide panel, as illustrated in FIG. 6, may be fabricated.

2. The BTO light-scattering particles as described with respect to method 1 may be locally clustered into a pattern visible to the eye, in some dropping conditions or drying conditions, so that the aesthetic appeal thereof may be degraded. To overcome such a problem, when only the light-scattering particles remain on the base substrate, a solution including a minute amount of smaller light-scattering particles (e.g. light-scattering particles having an average particle size equal to or smaller than 200 nm), as well as a matrix, and a solvent may be applied over the BTO light-scattering particles to form a binder layer (i.e. a matrix layer) with the uniform thickness on the entire area to sufficiently cover the light-scattering particles. The binder layer (i.e. a matrix layer) has high transmissivity and low haze (e.g. 5% or lower), due to the minute amount of the smaller light-scattering particles. Consequently, the light guide panel, as illustrated in FIG. 7, may be fabricated.

3. Two different-density solutions (having different densities of light-scattering particles) are simultaneously and/or continuously applied using two inkjet printer heads. In each of the solutions, a transparent binder (i.e. matrix) and light-scattering particles having a high refractive index are dispersed in a solvent. The coating may be performed by three methods as follows:

According to the first method, solutions including different densities of light-scattering particles with respect to a matrix are applied to local areas of the surface of a base substrate on which a light-scattering layer is to be formed, as illustrated in FIG. 9. For example, the base substrate may be coated with the light-scattering layer by applying only a first solution including a higher density of light-scattering particles with respect to the matrix to a first local area, only a second solution including a lower density of the light-scattering particles with respect to the matrix to a second local area, only the first solution to a third local area, and so on. The first solution and the second solution may be sequentially or simultaneously applied. In the central area, the first solution is applied to a greater number of local areas (i.e. a wider area) and the second solution is applied to a smaller number of local areas (i.e. a narrower area), compared to the case of the peripheral area.

The second method may include simultaneously applying the first solution and the second solution to local areas while adjusting the amounts thereof. For example, the base substrate may be coated with the light-scattering layer by applying both the first and second solutions to a first local area, both the first and second solutions to a second local area, both the first and second solutions to a third local area, and so on. In the central area, a greater amount of the first solution is applied to local areas and a smaller amount of the second solution is applied to local areas, compared to the case of the peripheral area.

The third method is to combine the above-described two methods.

What is claimed is:

1. A light guide panel comprising:
    a base substrate comprising a top surface, a bottom surface opposing the top surface, and side surfaces connecting the top and bottom surfaces, at least one side surface among the side surfaces defining a light incident surface; and
    a light-scattering layer provided on at least one of the top and bottom surfaces of the base substrate, the light-scattering layer comprising:
        a first central portion distant from the light incident surface;
        a second peripheral portion located closer to the light incident surface than the first central portion and encompassing the first central portion, the thickness of the first central portion of the light-scattering layer being substantially equal to the thickness of the second peripheral portion of the light-scattering layer; and
        a matrix forming a first layer provided on the base substrate having first light-scattering particles dispersed in the matrix, the first light-scattering particles having a first average particle size range, a density of the first light-scattering particles in the first central portion being higher than a density of the first light-scattering particles in the second peripheral portion,
    wherein the density of the first light-scattering particles is less than 5 wt. %, the transmissivity of the light guide panel is higher than 80%, and the haze of the light guide panel is smaller than 10%; and
    wherein the surface roughness of the light-scattering layer is equal to or less than 1 μm.

2. The light guide panel of claim 1, wherein the light-scattering layer has a uniform thickness across the entire area of the light-scattering layer.

3. The light guide panel of claim 1, wherein the density of the first light-scattering particles continuously or gradually increases with an increase in a distance from the light incident surface.

4. The light guide panel of claim 1, wherein the light-scattering layer further comprises a second layer provided on the first layer.

5. The light guide panel of claim 4, wherein the light-scattering layer further comprises second light-scattering particles dispersed in the second layer, the second light scattering particles having a second average particle size range different from the first average particle size range, the density of the second light-scattering particles in the first central portion being substantially equal to the density of the second light-scattering particles in the second peripheral portion.

6. The light guide panel of claim 1, wherein the light-scattering layer comprises first local portions, in which the first light-scattering particles have higher density, and second local portions, in which the first light-scattering particles have lower density,
the first central portion comprises a greater number of the first local portions and a smaller number of the second local portions than the second peripheral portion.

7. The lighting device of claim 1 comprising a light source emitting light into the light guide panel through the light incident surface of the light guide panel.

8. A method of fabricating a light guide panel including a base substrate including top and bottom surfaces, and side surfaces, at least one of which defines a light incident surface, and a light-scattering layer, the method comprising:
forming the light-scattering layer on at least one surface of the top and bottom surfaces of the base substrate, the light-scattering layer including:
a first central portion distant from the light incident surface;
a second peripheral portion located closer to the light incident surface than the first central portion and encompassing the first central portion, the thickness of the first central portion of the light-scattering layer being substantially equal to the thickness of the second peripheral portion of the light-scattering layer; and
a matrix forming a first layer on the base substrate and first light-scattering particles dispersed in the matrix, the first light-scattering particles having a first average particle size range,
such that:
the density of the first light-scattering particles in the first central portion is higher than the density of the light-scattering particles in the second peripheral portion,
the density of the light-scattering particles is less than 5 wt. %,
the transmissivity of the light guide panel is higher than 80%,
the haze of the light guide panel is smaller than 10%; and
the surface roughness of the light-scattering layer is equal to or less than 1 μm.

9. The method of claim 8, wherein the light-scattering layer further comprises second light-scattering particles having a second average particle size range different from the first average particle size range, and
forming a second layer of the matrix comprises providing the matrix containing the second light-scattering particles therein on the first layer.

10. The method of claim 8, wherein the at least one surface of the base substrate comprises local areas,
forming the light-scattering layer comprises:
preparing a first mixture and a second mixture each including the matrix and the first light-scattering particles, wherein the density of the first light-scattering particles in the first mixture is higher than the density of the first light-scattering particles in the second mixture; and
applying one mixture selected from the first mixture and the second mixture on each of the local areas of the base substrate, such that the first mixture is applied to a greater number of the local areas in the first central portion than in the second peripheral portion and the second mixture is applied to a smaller number of the local areas in the first central portion than in the second peripheral portion.

11. The method of claim 8, wherein the at least one surface of the base substrate comprises local areas,
forming the light-scattering layer comprises:
preparing a first mixture and a second mixture each including the matrix and the first light-scattering particles, wherein the density of the first light-scattering particles in the first mixture is higher than the density of the first light-scattering particles in the second mixture; and
applying both the first mixture and the second mixture to each of the local areas of the base substrate, such that a greater amount of the first mixture and a smaller amount of the second mixture are applied to the local areas in the first central portion than in the second peripheral portion.

* * * * *